Figure 10:
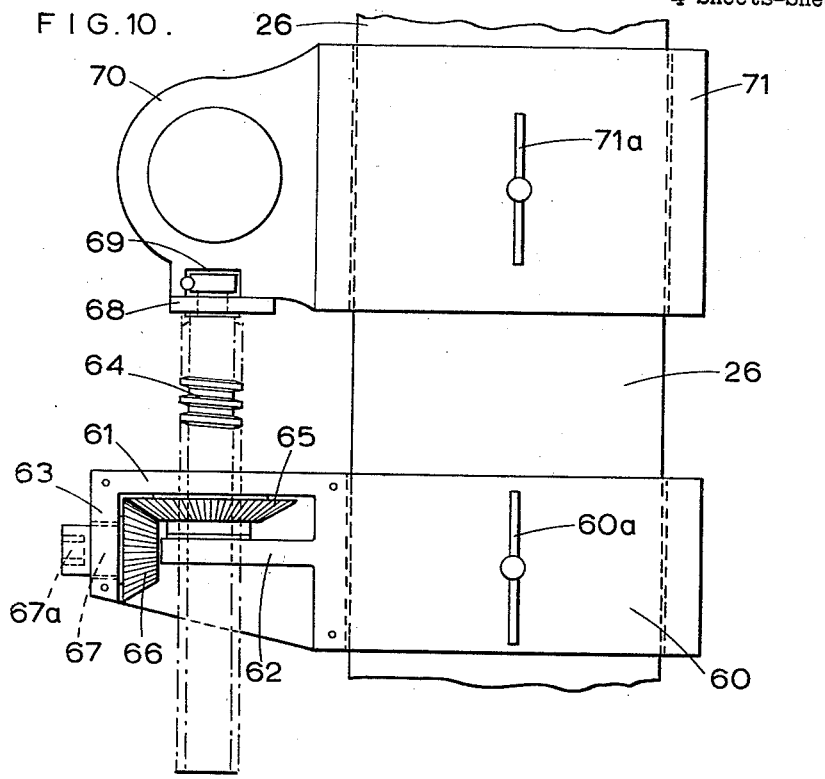

June 22, 1965 C. J. NEWMAN 3,190,465
TREE TRAILER
Filed March 19, 1962 4 Sheets-Sheet 1
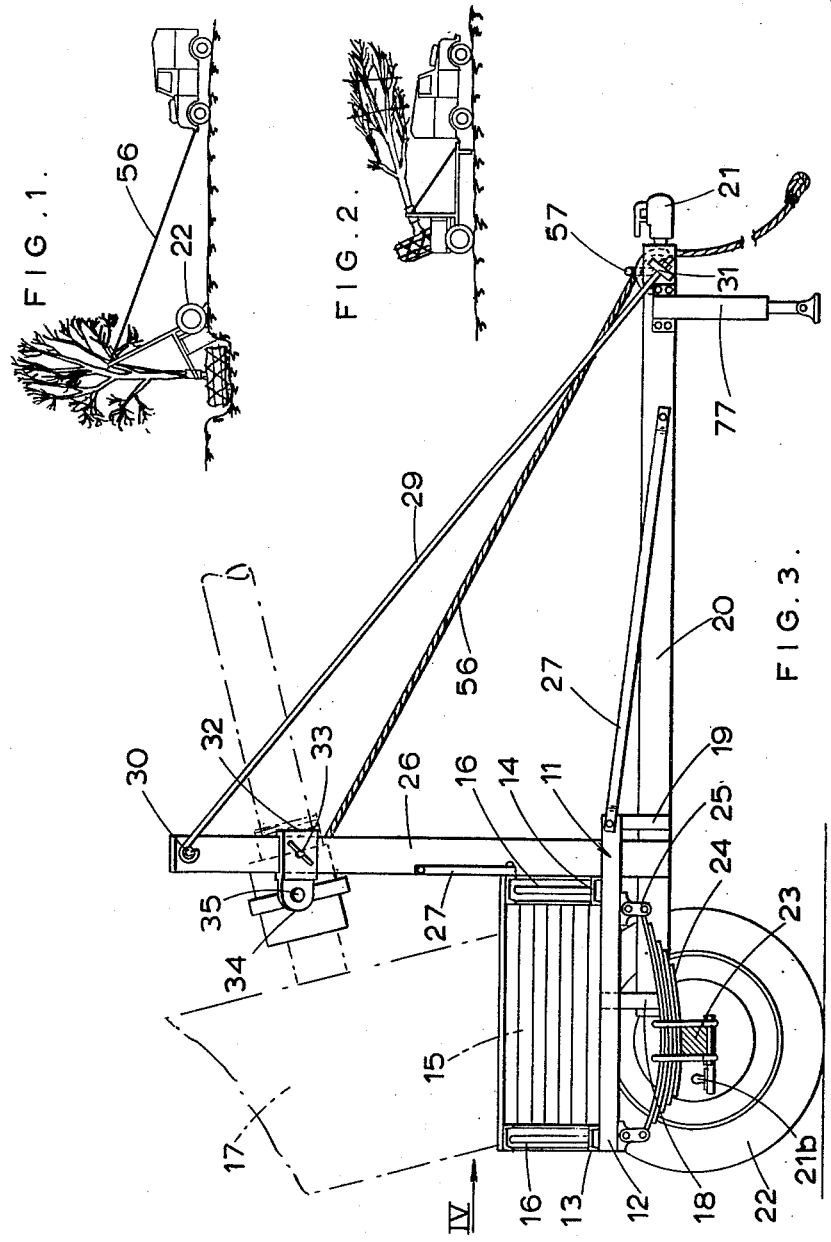
INVENTOR
CHRISTOPHER JOHN NEWMAN
BY
ATTORNEY June 22, 1965  C. J. NEWMAN  3,190,465
TREE TRAILER
Filed March 19, 1962  4 Sheets-Sheet 2
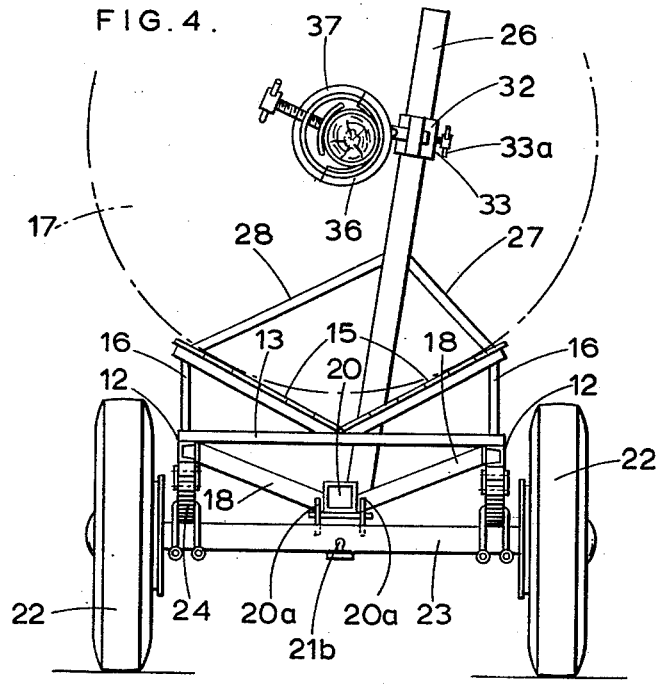
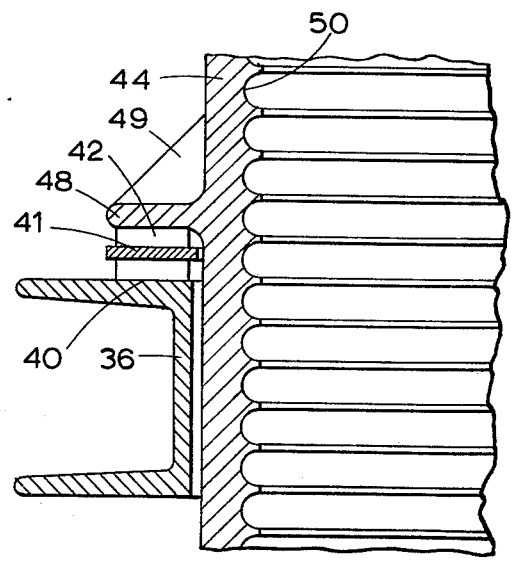
INVENTOR
CHRISTOPHER JOHN NEWMAN
BY
ATTORNEY

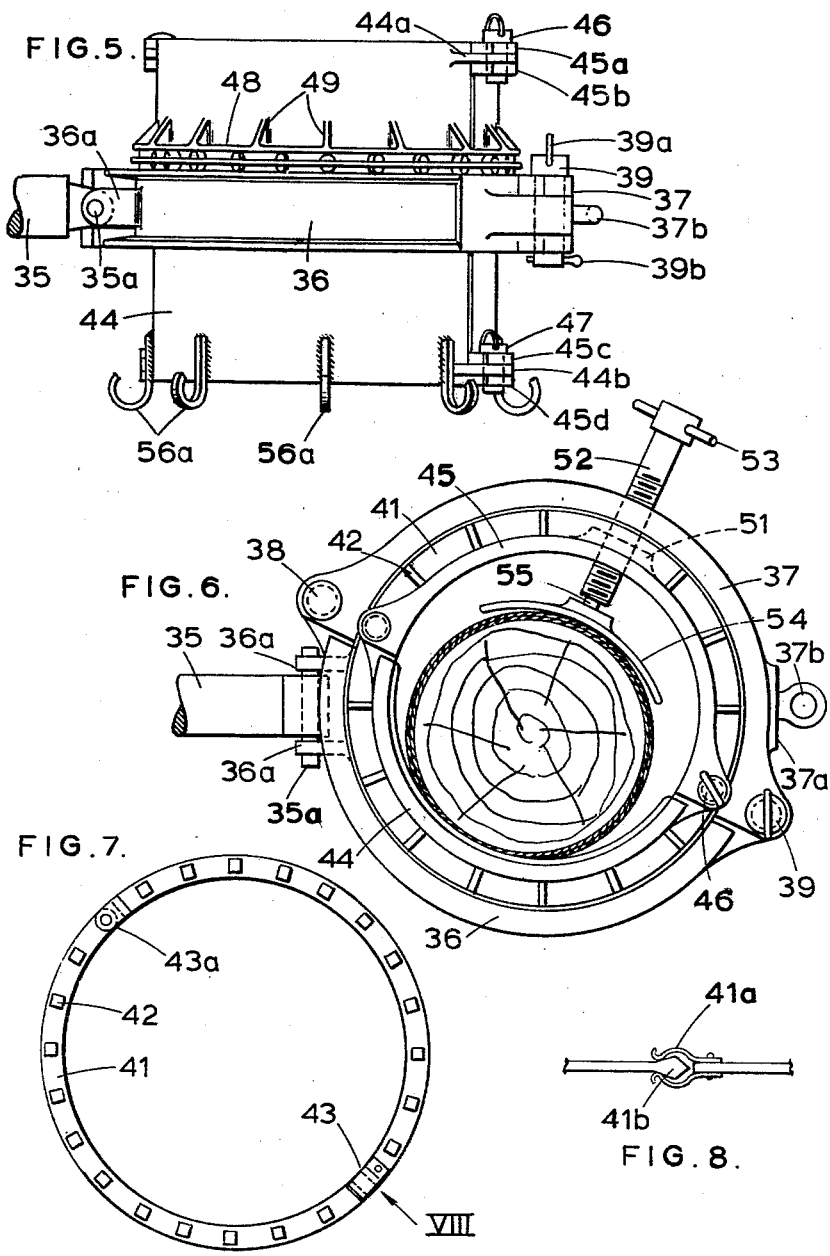

June 22, 1965  C. J. NEWMAN  3,190,465
TREE TRAILER
Filed March 19, 1962  4 Sheets-Sheet 4

INVENTOR
CHRISTOPHER JOHN NEWMAN
BY
ATTORNEY

United States Patent Office 3,190,465
Patented June 22, 1965

3,190,465
TREE TRAILER
Christopher John Newman, 1 Stocks Road,
Aldbury, near Tring, England
Filed Mar. 19, 1962, Ser. No. 181,504
5 Claims. (Cl. 214—3)

This invention relates to trailers for the carriage of trees. The transplanting of trees, whether in garden nurseries or forestry nurseries, seldom takes place after the tree is more than a few years old, partly due to the risk in attempting to transplant a tree of substantial size and partly due to the difficulties and the attendant cost. Further, to plant a tree in a given spot normally requires the selection of a tree of a suitable character from a nursery, and apart from the cost of transplanting and carriage, the cost of previously maintaining the tree in the nursery must be taken into consideration, thereby increasing the overall cost. It will be seen that when a relatively large tree is transplanted from a site where it has been growing naturally and without the expenses attendant upon its being reared in a nursery, the supplying of trees of substantial size suitable for transplanting is rendered less costly.

It is an object of the invention to provide apparatus that will enable a tree of substantial size and weight (up to about 6 tons) to be transplanted from a site where it has been growing naturally, in addition to transplantation from a nursery, and that will facilitate the carriage of the tree and its replanting.

It is a further object of the invention to provide apparatus that can be employed in less accessible locations than presently available cranes or trucks.

According to the invention, a trailer for the carriage of a tree comprises a frame supported on two coaxial road wheels, a tow-bar extending substantially horizontally from said frame and terminating in a towing hitch, a pillar secured to said frame and extending upwardly therefrom, a clamp supported on said pillar and arranged to embrace and grip the trunk of the tree, said clamp having an outer portion pivotable relatively to said pillar and an inner portion for gripping said trunk and capable of rotation relatively to said outer portion whereby said tree may be orientated in said clamp about the axis of said trunk, and cable means extending from said clamp through a guide on said tow-bar.

The outer and inner portions of the clamp conveniently each comprise two semi-cylindrical parts hingedly secured to one another and arranged to be hinged into an open position to admit the trunk and to be closed around the trunk.

The frame may be provided with a saddle arranged to receive the root-ball of the tree and the clamp may be pivotable relatively to the pillar about a horizontal axis transverse to the trailer and about an axis lying in a median vertical longitudinal plane relatively to the trailer. The inner and outer portions of the clamp may have antifriction bearing means providing rotation.

Figure 11:
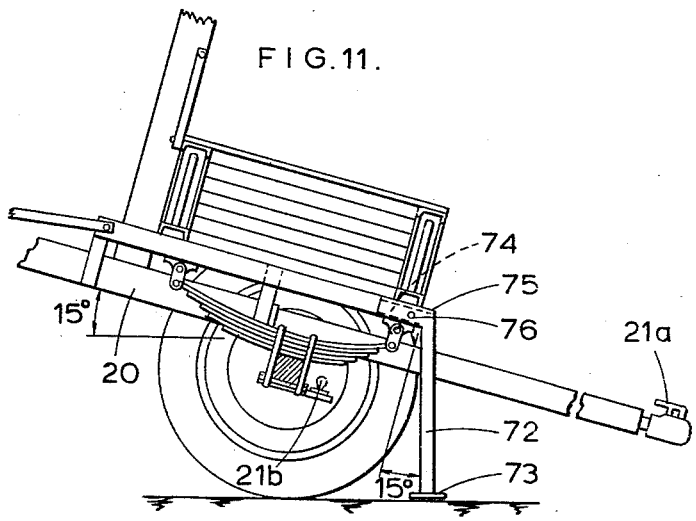

Embodiments of the invention will be described with reference to the accompanying drawings, in which:

FIGURE 1 is a diagrammatic illustration of one embodiment of trailer according to the invention being moved into position to have a tree loaded thereonto, FIGURE 2 is a similar diagrammatic view showing the tree in position on the trailer in the course of towing, FIGURE 3 is a side elevation of the trailer, FIGURE 4 is an end elevation in the direction of the arrow IV, FIGURE 3, FIGURE 5 is a side elevation, to an enlarged scale, of a clamp, FIGURE 6 is a plan thereof, FIGURE 7 is a plan of part of the anti-friction means of the clamp, FIGURE 8 is a fragmentary elevational view thereof, in the direction of the arrow VIII, FIGURE 7, FIGURE 9 is a fragmentary vertical section of part of the clamp showing the anti-friction means to a greatly enlarged scale, FIGURE 10 is a fragmentary side elevation of another form of clamp, to a greatly enlarged scale, and FIGURE 11 is a fragmentary diagrammatic side elevation of part of a trailer showing a safety prop.

Referring to FIGURES 1 to 9, a trailer comprises a frame 11 having two side members 12 disposed horizontally and two cross-members 13, 14 supporting a saddle 15 on struts 16. The saddle consists of two downwardly converging platforms arranged to receive the root-ball, indicated at 17, of the tree to be carried.

Downwardly sloping transverse members 18, 19 connect the frame 11 with a tow-bar 20, which extends forwardly and terminates in a towing hitch 21 of any suitable character for co-operation with a towing vehicle. Brake gear and other running gear normally associated with a trailer may be provided as required, but form no essential part of the invention. Road wheels 22 are supported on an axle 23 with springs 24 mounted thereon and secured by shackles 25 to the underside of the frame 11, and again these road wheels and their associated components call for no particular description.

A pillar 26 extends upwardly, springing from one side of the tow-bar 20, to which it is rigidly secured, and suitable bracing members 27, 28 extend between the saddle 15 and the pillar 26 and between the frame 11 and towbar 20 so as to form a rigid structure. The pillar 26 is inclined to one side, as will be seen from FIGURE 4, for a purpose that will become apparent hereinafter.

The pillar is further braced by a structural member 29 extending from an anchorage point 30 at the top of the pillar to a pick-up point at the front of the tow-bar 20, where it has adjusting means 31 enabling the structural member 29 to be altered in effective length as required. The member 29 has been omitted from FIGURE 4 for clarity.

Slidably disposed on the pillar 26 is a clamp assembly having a sleeve 32 provided with a bar 33 in threaded engagement with the sleeve and provided with handles 33a to enable it to clamp the sleeve to the pillar 26 at any desired height. The sleeve 32 has a lug 34 in which there is pivotally mounted a trunnion 35 on which the outer portion of a clamp is mounted.

This outer portion comprises halves 36, 37 as may be seen from FIGURES 4 to 6, each half consisting essentially of a semi-circular portion having either one or two lugs at each of its ends arranged for interdigitated engagement with a complementary lug or lugs on the adjacent end of the other half, the two halves being secured together by pivot pins 38, 39. The interdigitated relation of the complementary portions of the lugs will be seen in FIGURE 5. The pins 38, 39 are a loose fit, enabling one pin to be removed to permit the halves 36, 37 to be hingeable relatively to one another about the other pin, or for both pins to be removed to enable the halves to be completely separated.

The pin 39 (see FIGURE 5) has a pivoted D-ring 39a mounted in its head, and a removable locking pin 39b at its other end. Any other suitable means may be provided to facilitate handling of the pivot pins.

Each half of the outer portion of the clamp is formed with a track indicated at 40 (see FIGURE 9) for a roller race assembly consisting of a cage 41 (see FIGURE 7) carrying rollers 42 and split at 43 so that the portions of the race can be pivoted about the pivot pin 43a. The split ends of the race 41 are held together by a spring clip 41a gripping an enlargement 41g, see FIGURE 8. When the halves 36, 37 are to be separated, the cage 41 is opened about its pivot 43a and removed.

The clamp comprises an inner portion also consisting of two halves 44, 45. These members are considerably greater in axial length than the halves 36, 37 and are therefore hingedly secured together in the same manner as previously described, but with four sets of interdigitated lugs, disposed in pairs diametrically opposite one another and with the pivot pins on each side coaxial.

Referring to FIGURE 5, lugs 45a, 45b are interdigitated with lug 44a and hingedly secured thereto by pivot pin 46, while lugs 45c and 45d are interdigitated with lug 44b and in pivotal engagement therewith by means of pivot pin 47, which is coaxial with pivot pin 46. Corresponding arrangements are provided diametrically opposite, so that the inner portion of the clamp may be hinged or the halves 44, 45 completely separated from one another as required.

Each half 44, 45 has an outwardly extending peripheral flange 48, strengthened at intervals by webs 49, and so disposed that the flange bears on the tops of the rollers 42, whereby the entire assembly of the inner portion of the clamp 44, 45 is rotatable relatively to the outer portion 36, 37. The inner surface of the half 44 is formed with grooves 50, as indicated in FIGURE 8 for a purpose to be described.

The half 45 has a boss 51 formed with an aperture arranged to receive in threaded engagement therewith a screw 52 having a tommy-bar 53 at its outer end and a pressure plate 54 at its inner end, the screw 52 being arranged at 55 to be rotatable in a recess in the pressure plate 54, whereby rotation of the screw 52 may be accomplished without corresponding rotation of the pressure plate 54.

The trunnion 35, which permits the clamp assembly to be rocked about the horizontal axis of said trunnion (see FIGURES 5 and 6) has at the end thereof nearer the clamp a cross-pin 35a journalled in lugs 36a projecting radially outwardly from the half 36, so enabling the entire clamp to be rockable about the axis of the cross-pin 35a as well as about the axis of the trunnion 35.

Diametrically opposite the trunnion, the half 37 has a boss 37a from which projects an eye 37b, to which may be attached one end of the cable 56, the other end of which passes through a fairlead 57 located near the end of the tow-bar 20.

The lower edges of the halves 44, 45 are furnished with hooks 56a unitary therewith.

In operation, the tree to be moved is prepared beforehand over whatever period may be considered requisite. Thus, a trench may be dug around the roots a year or more before the tree is intended to be moved. If the trench is dug around the entire periphery of the tree, one lateral root may be left to anchor the tree until it is to be lifted, or the trench may extend only half-way round one year, and be completed in the following year. Whatever procedure is followed, by the time the tree is ready to be lifted it has a compact root-ball extending only a few feet out in radius around the trunk of the tree and terminating in a large quantity of fine fibrous roots which may be easily dislodged at their outer ends, and the root-ball may then be wrapped in hessian and roped. The bole of the tree is also protected with rope which is wound round it over the required distance depending on the dimensions of the tree. The tap root is severed after the covering of the root-ball with hessian. The trailer is then addressed to the tree and tipped up as shown in FIGURE 1. Control of the trailer in this position is effected by the cable 56 secured to the eye 37g of the clamp, passing through the fairlead 57 and attached to the towing vehicle. The road wheels 22 are then chocked to ensure that they do not move and the sleeve 32 is loosened on the pillar 26 by operation of its clamping screw 33 and is located on the pillar so that it is brought into the immediate vicinity of the trunk of the tree. The halves of each of the outer and inner portions of the clamp and of the race 41 are then separated or hinged away from one another by suitable removal of such of the pivot pins 38, 39, 46, and 47 as may be necessary, and the portion of the trunk wrapped with rope is disposed between the halves 44, 45 of the inner portion of the clamp. The pivot pins of said inner portion are replaced, the split portions of the cage 41 are located correctly in the halves 36, 37 and said halves are themselves located around the inner portion of the clamp, and the screw 52 is then tightened so as to bring the clamp and trunk into the relative positions shown in FIGURE 6, the wrapped portion of the trunk being gripped between the half 44 of the inner portion of the clamp and the pressure plate 54, whereby the grooves 50 on the inside of the inner portion of the clamp are caused to engage with the rope wrapped around the trunk.

After the clamp has been secured around the trunk, the ropes around the root-ball are connected with the hooks 56a at an angle of about 30–45°. About half of the lifting load is thus transmitted through the hooks to the clamp, while the other half is taken by means of the grip exerted by the clamp on the rope-wrapped portion of the trunk.

The winch of the towing vehicle is then operated or the vehicle itself is moved to draw in the cable 56, whereupon the trailer pivots about the axis of its road wheels 22 and lifts the tree bodily, the tree, during this movement, being controlled by the operator so that the root-ball is settled into the saddle 15. If the tree has been correctly located relatively to the trailer, by the time the latter has reached the position shown in FIGURE 2, the weight of the head of the tree will be in approximate balance with the weight of the root-ball, so that the trailer is nose-heavy to the desired extent at the towing hitch, which is then coupled to the hitch of the towing vehicle.

Reference to FIGURE 4 shows the reason for the lateral displacement of the pillar 26. By this means the trunk of the tree is located directly over the centre-line of the trailer. Should the trunk, however, be offset by reason of its inherent irregular growth, this may be corrected by rotation of the inner portion of the clamp relatively to the outer portion, the trunk being, as will be seen from the figure, eccentric relatively to said outer portion of the clamp.

During pivoting of the trailer from the position of FIGURE 1 to that of FIGURE 2, undesirably large forces might be exerted on the spring shackles 25, especially when a heavy tree is being handled. To minimize these, the axle 20 may be provided with vertical flanges 20a (see FIGURE 4) which will act as buttresses against which the members 18 of the frame may bear, so transmitting loads direct to the axle and not through the springs and shackles.

The normal towing position is as illustrated in FIGURE 2. It will be seen that the head of the tree has had the branches roughly tied to bring them into a smaller space, should this be possible or desirable. It will, however, be appreciated that in certain circumstances it may be preferable to tow the trailer in the direction opposite to that illustrated in FIGURE 2, i.e. roots first, with the crown trailing, and this is suitable when negotiating narrow lanes. For this purpose there may be provided an extension of the tow-bar 20 projecting on the other side of the axle 23 and having at its end another towing hitch 21a similar to the hitch 21 to enable "root first" towing to be effected (see FIGURE 11). In addition to this second hitch 21a, there may be provided a towing-ball 21g located alongside the second hitch enabling a second trailer to be towed behind the first trailer.

Referring to FIGURE 10, additional adjustment may be provided for the clamp if desired. In this figure there is shown the pillar 26 having thereon a sleeve 60 provided with screw clamping means 60a to enable it to be secured in any desired position on the pillar. Projecting from the sleeve 60 are lugs 61, 62, 63, apertured to receive a jackshaft 64 and a spindle 67 socketed at 67a, and carrying respectively bevel wheels 65, 66. The jackshaft 64 passes at its upper end through a thrustplate 68 and terminates in a recess 69 in a lug 70 projecting from another sleeve 71 having screw clamping means 71a, and which corresponds with the sleeve 32 illustrated in FIGURES 3 and 4. It is thus possible, by application of a jack handle to the socket 67a, to make adjustments to the location of the clamp on the pillar 26, for example, if after the tree has been loaded it is desired to alter its position slightly.

FIGURE 11 illustrates a safety prop 72 of a detachable character that may be employed if desired to steady the trailer during loading or unloading. The lower end of the prop 72 terminates in a foot 73 while the upper end has a spigot 74 arranged to be engageable in a socket 75 provided on a frame member 12, the spigot 74 being retained in the socket 75 by a lock pin 76. Such props may be provided either as a pair for engagement one on each side, either on the tow-bar side of the axle or the other side, or there may be four props provided. If desired, such props may be adjustable in their effective length in the manner of screw jacks.

It is desirable that the safety props should be so arranged as to maintain the tow-bar 20 at an angle of 15° to the horizontal.

The unloading of the trailer is in the main the reverse of loading, that is to say, the trailer is brought to the edge of the pit that has been dug to receive the root-ball and the road wheels 22 are chocked. The hitch 21 is then disengaged from the towing vehicle and the cable 56 is paid out by the winch or the towing vehicle is moved forward on the brake. If the towing vehicle is to be turned around from the towing position shown in FIGURE 2 to the loading or unloading position shown in FIGURE 1, the trailer may be temporarily supported on a jack 77 (see FIGURE 3) with or without the use of safety props such as are illustrated in FIGURE 11. The cable 56 is paid out by the winch and the tree is brought from the position indicated in FIGURE 2 to the position indicated in FIGURE 1. It may then be orientated when the root-ball is already in the pit but before it has reached the bottom thereof, by manual manipulation of the tree, the inner portion 44, 45 of the clamp being rotatable on the roller race 41 within the outer portion 36, 37 of the clamp. This will enable the tree to be orientated relatively to the north, to assume exactly the same position as it did before it was lifted, and this is a generally desirable feature. It may, however, be located in any other position as required.

Provision of the trunnion 35 and cross-pin 35a giving two directions of rotation between the pillar 26 and the clamp accommodates "leaning trees," that is to say, trees the lower part of the trunk of which is slightly out of the vertical.

I claim:
1. A trailer for the carriage of a tree, comprising a frame, two coaxial road wheels supporting the frame, a tow-bar extending substantially horizontally from said frame, a towing hitch at the end of said tow bar, a pillar secured to said frame and extending upwardly therefrom, a clamp supported intermediately of the length of and on said pillar and arranged to embrace and grip the trunk of the tree, said clamp having an outer portion pivotable relatively to said pillar and an inner portion for gripping said trunk, and cable means extending from said clamp through a guide on said tow bar, the inner and outer portions of said clamp each including two semi-cylindrical parts secured to one another and arranged to be closed around the trunk and having anti-friction bearings permitting said rotation.

2. A trailer as claimed in claim 1, wherein the outer and inner portions of the clamp each comprise two semi-cylindrical parts secured to one another and arranged to be closed around said trunk.

3. A trailer as claimed in claim 1, wherein said frame is provided with a saddle arranged to receive the root-ball of said tree.

4. A trailer as claimed in claim 1, wherein said clamp is pivotable relatively to said pillar about a horizontal axis transverse to said trailer and about an axis lying in a median vertical longitudinal plane relatively to said trailer.

5. A trailer for carriage of trees with trunks and root balls comprising a horizontal frame having a longitudinal axis, an axle on said frame transverse to said axis, two coaxial road wheels on said axle, a tow bar extending forwardly horizontally from said frame aligned with said axis, a towing hitch at the end of said tow bar, a fixed pillar extending obliquely upwardly from one side of the tow bar, a clamp supported on said pillar arranged to embrace and grip the trunk of the tree, said clamp having an inner circular separable portion and an outer circular separable portion, a vertically adjustable pivot mount for said clamp on said pillar, a cable extending from and attached to said clamp, a guide on said tow bar and said cable extending to said guide from said pivot mount, said clamp permitting said trunk to be rotated about the axis of the trunk when clamped therein and said pivot mount for said clamp being provided with a horizontal axis transverse to the longitudinal axis of the trailer and also an axis lying in a median vertical longitudinal plane relatively to said trailer.

References Cited by the Examiner

UNITED STATES PATENTS

| | | | |
|---|---|---|---|
| 690,607 | 1/02 | Ralston | 214—3 |
| 2,208,262 | 7/40 | Jeffrey | 214—3 |
| 2,242,695 | 5/41 | Coplen | 214—3 |
| 2,264,571 | 12/41 | Jeffrey | 214—3 |
| 2,792,948 | 5/57 | DeShano | 214—3 |

HUGO O. SCHULZ, *Primary Examiner.*

MORRIS TEMIN, *Examiner.*